United States Patent
Yamada et al.

(10) Patent No.: US 8,113,561 B2
(45) Date of Patent: Feb. 14, 2012

(54) MOUNTING STRUCTURE OF DOOR GRIP

(75) Inventors: Kazuki Yamada, Toyota (JP); Masami Uratsu, Aichi-ken (JP); Makoto Horiba, Toyota (JP); Junichi Kawakami, Aichi-ken (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 209 days.

(21) Appl. No.: 12/326,398

(22) Filed: Dec. 2, 2008

(65) Prior Publication Data

US 2009/0144940 A1 Jun. 11, 2009

(30) Foreign Application Priority Data

Dec. 5, 2007 (JP) ................................ 2007-315003

(51) Int. Cl.
*B60N 3/02* (2006.01)
(52) U.S. Cl. .............. 296/1.02; 296/153; 297/411.21
(58) Field of Classification Search .............. 16/412; 49/460; 296/1.02, 146.5, 146.7, 152, 153; 297/411.21
See application file for complete search history.

(56) References Cited

U.S. PATENT DOCUMENTS

| | | | | |
|---|---|---|---|---|
| 765,737 | A | * | 7/1904 | Keil ................................. 16/412 |
| 1,207,318 | A | * | 12/1916 | Parks ......................... 292/336.3 |
| 3,523,322 | A | * | 8/1970 | Rossow ............................ 16/412 |
| 4,728,143 | A | | 3/1988 | Tanino et al. |
| 6,149,224 | A | * | 11/2000 | Tiberia et al. ............... 296/146.7 |
| 6,196,607 | B1 | * | 3/2001 | Gulisano ......................... 296/39.1 |
| 6,409,249 | B1 | * | 6/2002 | Han ........................... 296/146.7 |
| 7,549,689 | B2 | * | 6/2009 | Pinkerton et al. ............ 296/1.02 |
| 2007/0024085 | A1 | * | 2/2007 | Steelman ...................... 296/153 |
| 2007/0132261 | A1 | * | 6/2007 | Ehrlich et al. ............... 296/1.02 |
| 2008/0022602 | A1 | | 1/2008 | Senoo |
| 2008/0256875 | A1 | | 10/2008 | Narimatsu et al. |

FOREIGN PATENT DOCUMENTS

| | | |
|---|---|---|
| CN | 1073515 | 10/2001 |
| DE | 3236405 A1 * | 4/1984 |
| EP | 63294 A1 * | 10/1982 |
| JP | 61064542 A * | 4/1986 |
| JP | 61-117750 | 7/1986 |
| JP | 62094435 A * | 4/1987 |
| JP | 2003-312351 | 11/2003 |
| JP | 2008-30514 | 2/2008 |

OTHER PUBLICATIONS

English language Abstract of JP 2003-312351, Nov. 6, 2003.
English language Abstract of JP 2008-30514, Feb. 14, 2008.

* cited by examiner

*Primary Examiner* — Glenn Dayoan
*Assistant Examiner* — Paul Chenevert
(74) *Attorney, Agent, or Firm* — Greenblum & Bernstein, P.L.C.

(57) ABSTRACT

Mounting structure of a door grip in a door for the vehicle includes a inner panel composing a door body. The mounting structure of a door grip further includes a door trim arranged so as to oppose to the inner side of the inner panel. The door grip is fixed to the inner panel via the door trim and having a pair of connecting parts to be connected to the door trim. Further included are fixing members for fixing the door trim to the inner panel. The fixing members are arranged in both sides of the connecting parts regarding an axis line passing through both the first connecting part and the second connecting part. The fixing members are respectively provided in both sides of the first connecting part while the fixing members are respectively provided in both sides of the second connecting part.

12 Claims, 5 Drawing Sheets

MOUNTING STRUCTURE OF DOOR GRIP

CROSS REFERENCE TO RELATED APPLICATION

The present application is based on and incorporates herein by reference Japanese Patent Application No. 2007-315003 filed on Dec. 5, 2007.

TECHNICAL FIELD

The present invention relates to a mounting structure of a door grip wherein the door grip is mounted to a inner panel via an interior base material.

BACKGROUND

As a mounting structure for this kind of door grip, the mounting structure disclosed in Japanese Unexamined Patent Publication No. 2003-312351 has been well-known. This door grip is composed of a grip base mounted to a inner panel and a grip cover for covering the surface of the grip base. On the other hand, provided in the interior base material is a hole penetrating therethrough. In the grip base, a pair of mounting bosses that extends toward the inner panel side from the surface side of the interior base material as penetrating through said hole is provided. Screw-fixing both mounting bosses from the inner side of a compartment to the inner panel allows the grip base to be fixed to the inner panel at two points.

However, regarding the above door grip, the grip base is fixed to the inner panel merely at two points, thereby causing a trouble as below. For example, such as that the door grip is twisted regarding an axis line passing through both mounting bosses as a reference, a clearance appears between the door grip and the hole in the interior base material, or an abnormal noise generates when the door grip and the interior base material rub each other. In response to the above, preventing the generation of such a clearance and an abnormal noise by directly fixing the door grip to the interior base material can be conceived. However, the interior base material may deform by flexure due to the weak strength of the interior base material when stress in the tensional direction acts on the door grip.

An object of the present invention is to hold a door grip in a normal posture in a configuration in which the door grip is mounted to an interior base material.

SUMMARY

The present invention relates to a mounting structure of a door grip in a door for the vehicle and comprises: an inner panel composing a door body, an interior base material arranged so as to oppose to the inner side of a compartment of the inner panel, a door grip fixed to the inner panel via the interior base material and having a pair of connecting parts to be connected to the interior base material, and a fixing member for fixing the interior base material to the inner panel, wherein the fixing member is arranged in both sides of the connecting part regarding the axis line passing through both connecting parts as a reference, and at least a pair of the fixing members is respectively provided in each connecting part.

In such configuration, when the door grip is twisted by a strong grip on the door grip, the interior base material intends to deform by flexure with a stress applied to both connecting parts. In response, the interior base material is fixed to the inner panel by at least a pair of the fixing members that is arranged in both sides of the connecting part regarding the axis line passing through both connecting parts as a reference, such that the deformation by flexure of the inner base material can be restrained, thereby preventing a twist of the door grip. As mentioned, this, also as a mounting structure of the door grip to the interior base material, allows the door grip to be held in a normal posture.

The following configuration is preferred as an embodiment of the present invention. The surface of the door grip may be covered with a skin, and both connecting parts may be screw-fixed from the outside of a compartment of the interior base material. Such configuration allows the door grip left in a state covered with a skin to be screw-fixed to the interior base material, while enhancing the design effect of the door grip since no screwing section is shown on the design surface of the door grip.

An interior part may be mounted to the inner side of a compartment of the interior base material, and the fixing member may be configured to fix the interior base material and the interior part to the inner panel. Such configuration allows the fixing member to double as a fixing member of the interior base material and of the interior part, and thereby fixing the interior base material to the inner panel with this fixing member. Consequently, the structure of the interior base material can be simplified.

A hole for attaching the interior part may be penetrated in the interior base material, and the fixing member may be provided inside of the hole. Such configuration allows the fixing member to be screw-fixed to the inner panel from the inner side of a compartment through the hole, and attaching the interior part to the hole can hide the fixing member from the outside.

A bracket may be comprised for connecting one connecting part among both connecting parts and the fixing member arranged in the side corresponding to this connecting part. Such configuration allows the door grip to be fixed to the inner panel through the bracket. Consequently, the mounting strength of the door grip can be enhanced.

According to the present invention, a door grip can be held in a normal posture in a configuration in which the door grip is mounted to an interior base material.

DETAILED DESCRIPTION OF THE PREFERRED ILLUSTRATIVE ASPECTS

Embodiment 1

Figure 1:
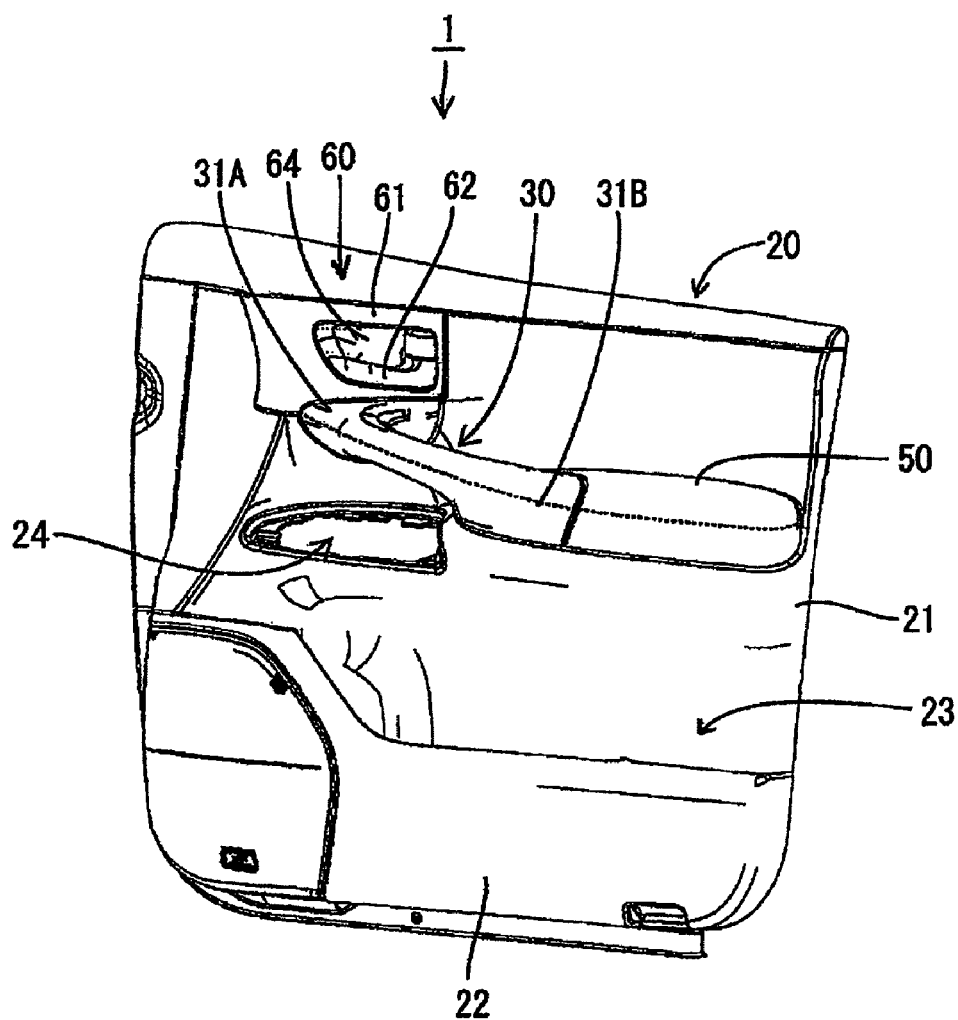
FIG. 1 shows a perspective view of a door for the vehicle.

As referring now to FIGS. 1 to 5, Embodiment 1 according to the present invention is described. A door trim 1 as an interior base material in the present embodiment is arranged so as to oppose to the inner side of a compartment of a metallic inner panel 10 that composes an exterior member of a door for the vehicle. The door trim 1 comprises, as shown in FIG. 1, an upper base 20, a middle board 21, and a lower board 22. The door trim 1 is composed of such as a synthetic resin material such as polypropylene and a wood-based material. The door trim 1 is constituted by connecting the upper base 20, the middle board 21, and the lower board 22 with a binding member. And also, a skin is fixedly adhered to the inner side of a compartment of the door trim 1 to cover partially or entirely. In addition, in FIGS. 1 to 3, the left side (left hand) is the front side (fore), while in FIGS. 4 and 5, the upper side is the inner side of a compartment.

Figure 4:
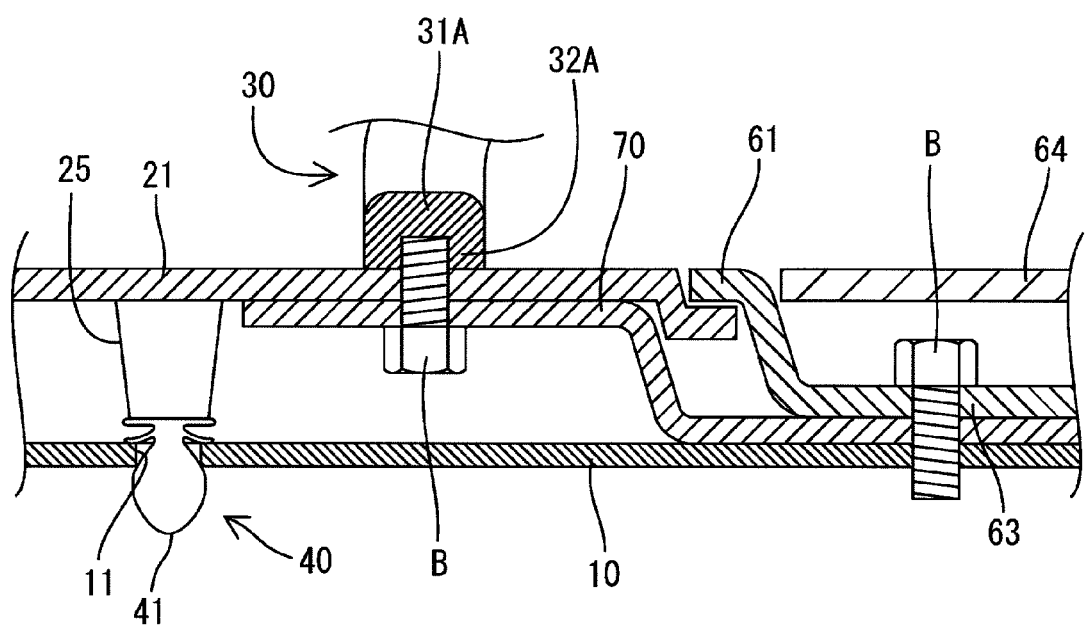
FIG. 4 shows a cross-sectional view indicating a mounting structure of a first connecting part of a door grip.
Figure 5:
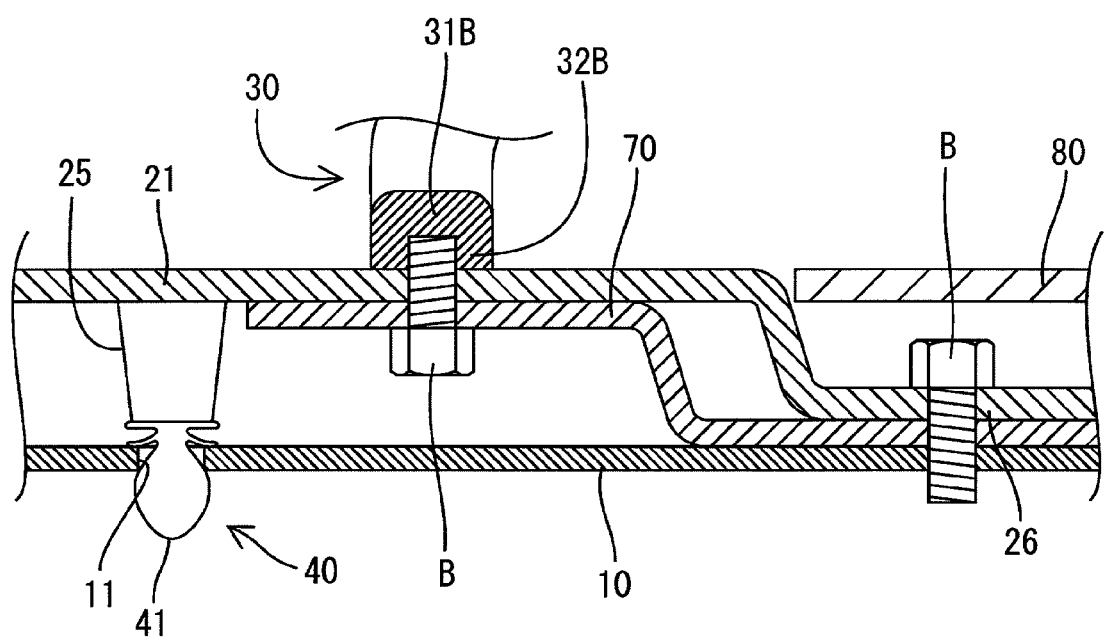
FIG. 5 shows a cross-sectional view indicating a mounting structure of a second connecting part of a door grip.

The middle board 21 to which the door grip 30 is mounted is described. On the outer surface of a compartment of the middle board 21, as shown in FIGS. 4 and 5, a plurality of clip seats (one example of "fixing member" in the present invention) 25 are provided in protrusion as uprising toward the outside of a compartment from the outer surface of a compartment of the middle board 21. A clip 40 made of synthetic resin is fixed to the projecting end of the clip seat 25. The clip 40 has a deformable member 41 that is elastically deformable. The deformable member 41 is inserted, as being shrunk in the diametrical direction, into an opening 11 in the inner panel 10. The deformable member 41 inserted into the opening 11 is elastically restored in a state penetrating through the opening 11 and locks in the opening edge of the opening 11. This locking allows the deformable member 41 to be attached to the opening 11. Consequently, the middle board 21 is fixed to the inner panel 10.

As shown in FIG. 1, a door pocket 23 is provided in the lower part in the inner side of a compartment of the middle board 21. This door pocket 23 opens upwardly. In the front of the door pocket 23, a speaker (not shown) is provided. Additionally, the lower board 22 composes the inner side of a compartment of the door pocket 23.

In the central part in the inner side of a compartment of the middle board 21, an armrest 50 is attached to allow an occupant seated in the seat to put his/her elbow. In addition, a door grip 30 is attached in the front of the armrest 50 in the inner side of a compartment of the middle board 21. The door grip 30 is formed so as to extend obliquely upward and be connected forward from the front end of the armrest 50.

The door grip 30 is connected to the middle board 21 at two points, where the front side connecting part is a first connecting part 31A, while the rear side connecting part is a second connecting part 31B. In the position adjacent to the front of the second connecting part 31B in the middle board 21, a first hole 24 is penetrated. A switch panel 80 (one example of "interior part" in the present invention) to which such as a switch for switching operation of a power window is attached, is fitted into the first hole 24. Additionally, inside of the first hole 24, a board fixing member (one example of "fixing member" in the present invention) 26 for screw-fixing the middle board 21 to the inner panel 10 with a fastening bolt B is provided.

Figure 2:
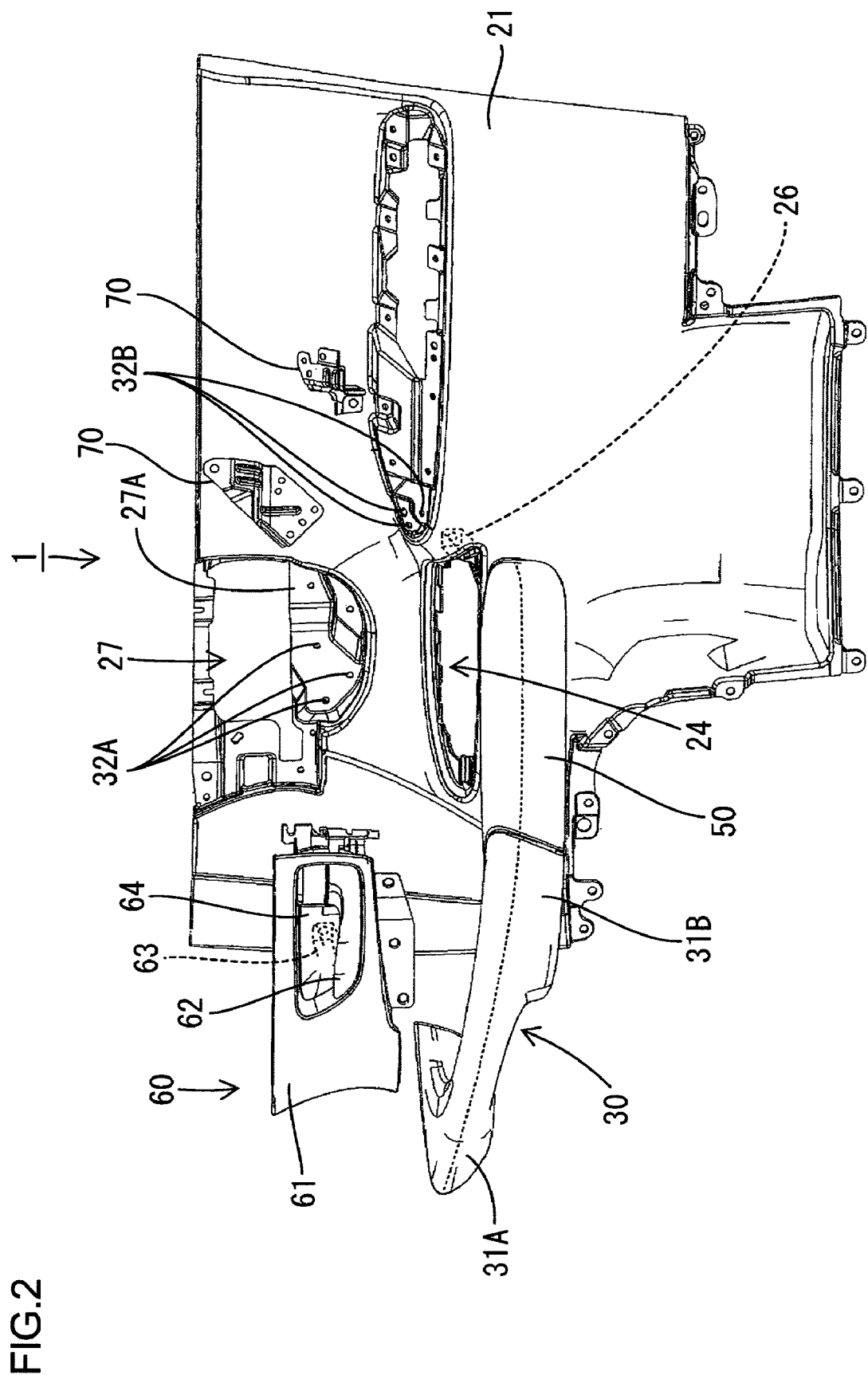
FIG. 2 shows an exploded perspective view of a door for the vehicle.

On the other hand, in the position adjacent to the upper part of the first connecting part 31A in the middle board 21, an inside handle member (one example of "interior part" in the present invention) 60 is provided. In addition, in a joint part with the inside handle member 60 in the middle board 21, as shown in FIG. 2, a second hole 27 is penetrated.

The inside handle member 60 has a handle cover 61 to be fitted in the second hole 27. The handle cover 61 is screw-fixed to a base member 27A provided on the peripheral edge of the second hole 27. The handle cover 61 has a recess part which is recessed toward the outside of a compartment. A handle 62 is housed in the recess part in the handle cover 61. The handle 62 has a shape extending forward from the rear end side. The front end side of the handle 62 is rotationally manipulable regarding the rear end side as a rotation center. A cover fixing member (one example of "fixing member" in the present invention) 63 is provided so as to open in the recess part in the handle cover 61. As illustrated in FIG. 4, screw-fixing the cover fixing member 63 to the inner panel 10 by the fastening bolt B allows the handle cover 61 to be fixed to the inner panel 10. And also, a cover member 64 is fitted to the recess part in the handle cover 61. The cover member 64 covers and hides the fastening bolt B screwed in the cover fixing member 63.

Figure 3:
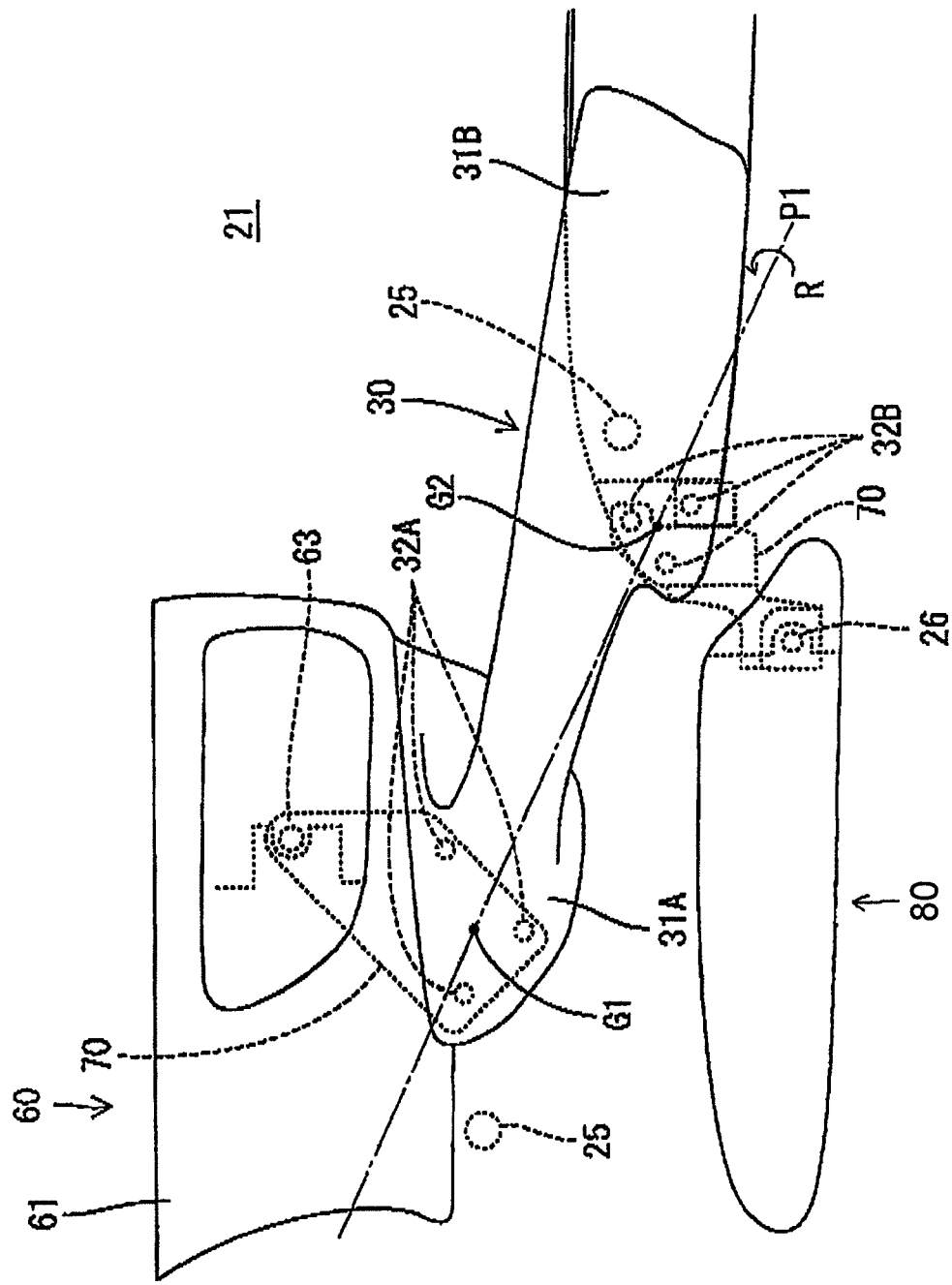
FIG. 3 shows a plain view indicating a mounting structure of a door grip.

A skin is previously adhered to the surface of the door grip 30 according to the present embodiment. As mentioned, when a skin is adhered to the surface of the door grip 30, the door grip 30 cannot be screw-fixed to the inner panel 10 from the inner side of a compartment of the middle board 21. And therefore, in the present embodiment, the door grip 30 is firstly fixed to the middle board 21, and the middle board 21 is then fixed to the inner panel 10. However, the door grip 30 is fixed to the middle board 21 at two connecting parts 31A and 31B arranged in the front-rear direction of a vehicle, and furthermore, the middle board 21 has a lower rigidity than the inner panel 10. Consequently, the door grip 30 might be twisted around the axis (direction R), as illustrated in FIG. 3, regarding an axis line P1 as a rotation center, when an occupant gripped and pulled the door grip 30 powerfully. In what follows, a mounting structure that solved the above problem of twist of the door grip 30 is described as referring to FIGS. 3 to 5.

Firstly, the definition of the axis line P1 of the door grip 30 is explained. Three first bolting parts 32A are provided in the first connecting part 31A. The first connecting part 31A and the middle board 21 are fixed to these first bolting parts 32A by the fastening bolts B by screw-fixing from the outside of a compartment. On the other hand, three second bolting parts 32B are provided in the second connecting part 31B. The second connecting part 31B and the middle board 21 are fixed to these second bolting parts 32B by the fastening bolts B by screw-fixing from the outside of a compartment. Here, when the center of gravity or the center of figure of a triangle having three first bolting parts 32A as its three vertices is a center of gravity G1 of the first connecting part 31A, and when the center of gravity or the center of figure of a triangle having three second bolting parts 32B as its three vertices is a center of gravity G2 of the second connecting part 31B, a straight line passing through both centers of gravity G1 and G2 is an axis line P1.

In the joint part with the first connecting part 31A in the middle board 21, there is provided a pair of fixing members in both sides of the axis line P1, and one fixing member is composed of a clip seat 25, while the other is composed of a cover fixing member 63. And also, the first bolting part 32A and the cover fixing member 63 are connected by a metallic bracket 70.

On the other hand, in the joint part with the second connecting part 31B in the middle board 21, there provided a pair of fixing members in both sides of the axis line P1, and one fixing member is composed of a clip seat 25, while the other is composed of a board fixing member 26. And also, the second bolting part 32B and the board fixing member 26 are connected by the metallic bracket 70.

FIG. 4 shows a simplified mounting structure of a door grip 30 in a first connecting part 31A. Additionally, in FIG. 4, the first connecting part 31A and the middle board 21 are connected by one fastening bolt B for the purpose of simplifying the figure, however, in this case, the center of the first bolting part 32A is the center of gravity G1.

The first connecting part 31A (the first bolting part 32A), the middle board 21, and one end of the bracket 70 are fastened together from the outside of a compartment of the middle board 21 by the fastening bolt B. In addition, the clip seat 25 is fixed, with the clip 40 fitted into the opening 11 in the inner panel 10. Moreover, the cover fixing member 63, the other end of the bracket 70, and the inner panel 10 are fastened together from the inner side of a compartment of the middle board 21 by the fastening bolt B. As mentioned above, the handle cover 61 provided with the cover fixing member 63 is screw-fixed to a base member 27A of the second hole 27 that opens in the middle board 21. Additionally, the cover fixing member 63 is covered with the cover member 64, so that the bolting part of the fastening bolt B cannot be seen from the outside.

FIG. 5 shows a simplified mounting structure of a door grip 30 in a second connecting part 31B. Additionally, in FIG. 5, the second connecting part 31B and the middle board 21 are connected by one fastening bolt B for the purpose of simplifying the figure, however, in this case, the center of the second bolting part 32B is the center of gravity G2.

The second connecting part 31B (the second bolting part 32B), the middle board 21, and one end of the bracket 70 are fastened together from the outside of a compartment of the middle board 21 by the fastening bolt B. In addition, the clip seat 25 is fixed, with the clip 40 fitted into the opening 11 in the inner panel 10. Moreover, the board fixing member 26, the other end of the bracket 70, and the inner panel 10 are fastened together from the inner side of a compartment of the middle board 21 by the fastening bolt B. Additionally, the board fixing member 26 is covered with the switch panel 80, so that the bolting part of the fastening bolt B cannot be seen from the outside.

The present invention has the above-mentioned configuration, and its action is hereinafter described. When the door grip 30 is pulled powerfully by an occupant seated in the seat, the middle board 21 intends to deform by flexure with the stress received from the first connecting part 31A, however, the clip seat 25 and the cover fixing member 63 respectively arranged in both sides of the first connecting part 31A are fixed to the inner panel 10 such that the deformation by flexure of the middle board 21 is restrained, thereby holding the door grip 30 in a normal posture. This allows to prevent a clearance between the handle cover 61 and the first connecting part 31A, as well as an abnormal noise caused by the rub between the handle cover 61 and the first connecting part 31A, from generating. Furthermore, the first connecting part 31A in the present embodiment is connected to the cover fixing member 63 by the bracket 70, so that the mounting strength of the door grip 30 can be enhanced.

On the other hand, similarly in the second connecting part 31B, the middle board 21 intends to deform by flexure with the stress received from the second connecting part 31B, however, the clip seat 25 and the board fixing member 26 respectively arranged in both sides of the second connecting part 31B are fixed to the inner panel 10 such that the deformation by flexure of the middle board 21 is restrained, thereby holding the door grip 30 in a normal posture. Furthermore, the second connecting part 31B in the present embodiment is connected to the board fixing member 26 by the bracket 70, so that the mounting strength of the door grip 30 can be enhanced.

Next, a method for assembling the door trim 1 for the vehicle is simply explained. Firstly, the handle cover 61 is fitted into the second hole 27 to be screw-fixed to the base member 27A, and then the door grip 30 and the armrest 50 are set in the center position in the inner side of a compartment of the middle board 21. Next, the armrest 50 is screw-fixed from the outside of a compartment of the middle board 21 by the fastening bolt B, and at the same time, both bolting parts 32A and 32B of the door grip 30 and one end side of the bracket 70 are screw-fixed from the outside of a compartment of the middle board 21 by the fastening bolt B.

Next, the middle board 21 with the door grip 30 mounted thereto is mounted to the inner panel 10. This mounting work is conducted by fitting the clip 40 attached to the projecting end of the clip seat 25 into the opening 11 in the inner panel 10. And then, the cover fixing member 63 and the other end of the bracket 70 are screw-fixed to the inner panel 10 from the inner side of a compartment of the middle board 21 by the fastening bolt B. Following this, attaching the cover member 64 to the handle cover 61 allows the fastening bolt B fixing the cover fixing member 63 to be hidden from the outside.

And also, the board fixing member 26 and the other end of the bracket 70 are screw-fixed to the inner panel 10 from the inner side of a compartment of the middle board 21 by the fastening bolt B. Following this, fitting the switch panel 80 into the first hole 24 allows the fastening bolt B fixing the board fixing member 26 to be hidden from the outside. In this manner, the assembly of the door trim 1 for the vehicle completes.

According to the present embodiment, as mentioned, both connecting parts 31A and 31B arranged at both ends of the door grip 30 are fixed to the middle board 21, while the middle board 21 is fixed to the inner panel 10 at four points: both clip seats 25 respectively arranged in both sides of the door grip 30 regarding the axis line P1 of the door grip 30 as a reference, the board fixing member 26, and the cover fixing member 63. Consequently, the rotational movement of the door grip 30 around the axis line P1 can be restrained even when the door grip 30 is gripped and pulled powerfully, thereby holding the door grip 30 in a normal posture.

As mentioned, the door grip 30 with a skin adhered to the surface thereof can be connected to the middle board 21, and thus, no screwing section appears on the design surface of the door grip 30. Therefore, the design effect of the door grip 30 can be enhanced. In addition, the middle board 21 is fixed to the inner panel 10 by the cover fixing member 63, thereby simplifying the mounting structure of the door grip 30.

Furthermore, the board fixing member 26 and the cover fixing member 63 are screw-fixed from the inner side of a compartment of the middle board 21 by the use of the first hole 24 and the second hole 27, and then, after the completion of the screw-fixing, the switch panel 80 and the handle cover 61 are attached so as to hide the fastening bolt B from the outside.

In addition, the use of the bracket 70 fixes the connecting part 31A in the door grip 30 and the cover fixing member 63, while connecting the connecting part 31B in the door grip 30 and the board fixing member 26, so that the mounting strength of the door grip 30 can be enhanced.

Other Embodiments

With embodiments of the present invention described above with reference to the accompanying drawings, it is to be understood that the invention is not limited to those precise embodiments, and the embodiments as below, for example, can be within the scope of the present invention.

(1) In the above embodiment, a pair of fixing members (the clip seat 25 and the cover fixing member 63 in the first connecting part 31A, while the clip seat 25 and the board fixing member 26 in the second connecting part 31B) are respectively provided in both connecting parts 31A and 31B, however, according to the present invention, three or more fixing members may be respectively provided in both connecting parts 31A and 31B.

In the above embodiment, a line passing through the center of gravity or the center of figure G1 of the first bolting parts 32A and the center of gravity or the center of figure G2 of the second bolting parts 32B is the axis line P1, however, according to the present invention, the line does not always have to be passing through both centers of gravity G1 and G2, if it is at least passing through both connecting parts 31A and 31B.

(3) In the above embodiment, the cover fixing member 63 in the handle cover 61 composes the fixing member, however, according to the present invention, the base member 27A in the second hole 27 in the middle board 21 may compose the fixing member.

(4) In the above embodiment, the fixing member is screw-fixed from the inner side of a compartment of the middle board 21 by the use of the first hole 24 and the second hole 27, however, according to the present invention, an attaching member for attaching the armrest 50 may be provided as the fixing member so as to be screw-fixed from the inner side of a compartment of the middle board 21.

What is claimed is:

1. A mounting structure of a door grip in a door for a vehicle, comprising:
   an inner panel composing a door body;
   an interior base material arranged so as to oppose an inner side of a compartment of the inner panel;
   a door grip which has a pair of connecting parts connected to the interior base material and fixed to the inner panel via the interior base material; and
   a plurality of fixing members for fixing the interior base material to the inner panel,
   wherein the plurality of fixing members are arranged on both sides of the connecting part along an axis line passing through both connecting parts as a reference, and
   wherein at least a pair of the fixing members is respectively provided for each connecting part;
   wherein at least one fixing member for each connecting part fixes the interior base material indirectly to the inner panel; and
   wherein at least one fixing member for each connecting part fixes the interior base material directly to the inner panel.

2. The mounting structure of the door grip according to claim 1, further comprising a bracket for connecting one of the pair of connecting parts and at least one of the plurality of fixing members which fixes the interior base material indirectly to the inner panel and which is arranged in the side corresponding to the one connecting part.

3. The mounting structure of the door grip according to claim 1, further comprising an interior part to be mounted to an inner side of a compartment of the interior base material, wherein the plurality of fixing members fix the interior base material and the interior part to the inner panel.

4. The mounting structure of the door grip according to claim 3, further comprising a bracket for connecting one of the pair of connecting parts and at least one of the plurality of fixing members which fixes the interior base material indirectly to the inner panel and which is arranged in the side corresponding to the one connecting part.

5. The mounting structure of the door grip according to claim 3, wherein a hole for attaching the interior part penetrates the interior base material, and at least one of the plurality of fixing members is provided inside of the hole.

6. The mounting structure of the door grip according to claim 5, further comprising a bracket for connecting one of the pair of connecting parts and at least one of the plurality of fixing members which fixes the interior base material indirectly to the inner panel and which is arranged in the side corresponding to the one connecting part.

7. The mounting structure of the door grip according to claim 1, further comprising a skin for covering a surface of the door grip, wherein both connecting parts are screw-fixed from an outside of a compartment of the interior base material.

8. The mounting structure of the door grip according to claim 7, further comprising a bracket for connecting one of the pair of connecting parts and at least one of the plurality of fixing members which fixes the interior base material indirectly to the inner panel and which is arranged in the side corresponding to the one connecting part.

9. The mounting structure of the door grip according to claim 7, further comprising an interior part to be mounted to an inner side of the compartment of the interior base material, wherein the plurality of fixing members fix the interior base material and the interior part to the inner panel.

10. The mounting structure of the door grip according to claim 9, further comprising a bracket for connecting one of the pair of connecting parts and at least one of the plurality of fixing members which fixes the interior base material indirectly to the inner panel and which is arranged in the side corresponding to the one connecting part.

11. The mounting structure of the door grip according to claim 9, wherein a hole for attaching the interior part penetrates the interior base material, and at least one of the plurality of fixing members is provided inside of the hole.

12. The mounting structure of the door grip according to claim 11, further comprising a bracket for connecting one of the pair of connecting parts and at least one of the plurality of fixing members which fixes the interior base material indirectly to the inner panel and which is arranged in the side corresponding to the one connecting part.

* * * * *